Sept. 4, 1923.

J. F. BLASAUF ET AL 1,466,984

AUTOMOBILE CAMP BED AND MEANS FOR CARRYING SAME

Filed Aug. 11, 1921

INVENTOR
John F. Blasauf
Laurence V. Hose
BY

Bradley L Benson
ATTORNEYS

Patented Sept. 4, 1923.

1,466,984

UNITED STATES PATENT OFFICE.

JOHN F. BLASAUF AND LAURENCE V. HOSE, OF SAN FRANCISCO, CALIFORNIA.

AUTOMOBILE CAMP BED AND MEANS FOR CARRYING SAME.

Application filed August 11, 1921. Serial No. 491,417.

*To all whom it may concern:*

Be it known that JOHN F. BLASAUF and LAURENCE V. HOSE, each a citizen of the United States of America, residing at 845 Polk Street, San Francisco, in the county of San Francisco and State of California, have invented certain new and useful Improvements in Automobile Camp Beds and Means for Carrying Same, of which the following is a specification.

The present invention is an automobile camp bed and means for carrying same on an automobile.

The objects of the invention are;

(1) To provide a comfortable camp bed which is so constructed that it can be readily supported and carried on the body of an automobile, in such a manner that it may be transported by the car without discomfort to passengers.

(2) To so dispose a camp bed on an automobile that the appearance will not be objectionable when travelling, as is the case when the bed and bedding are rolled and carried on the runboards as is now customary.

(3) To provide means whereby a metal bed frame of rigid structure may be carried overhead on an automobile body in such a manner that, when not required for use as a bed, it will serve as a top and, when needed as a bed, is readily detachable.

In this specification and the annexed drawings, the invention is illustrated in the form considered to be the best, but it is to be understood that the invention is not limited to such form, because it may be embodied in other forms, and it is also to be understood that in and by the claims following the description it is desired to cover the invention in whatever form it may be embodied.

In the accompanying one sheet of drawings.

Figure 1:
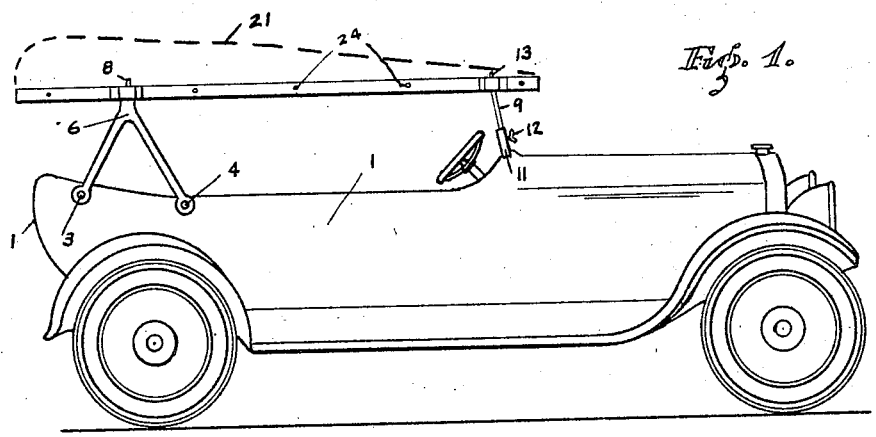
Fig. 1 is a side elevation of an automobile with the top removed, with my bed and supports installed thereon.

Referring to the drawings, the numeral 1 indicates a conventional automobile body, provided with a wind shield frame 2, and with stud bolts 3 and 4 to which the top is removably attached.

At 6 we show a brace support, in the form of an inverted Y, the diverging members of which are provided with holes 7 adapted to engage the stud bolts 3 and 4. The top of the brace is provided with a stud 8.

One of the braces 6 is provided on each side of the body to support one end of a bed frame to be later described.

Figure 4:
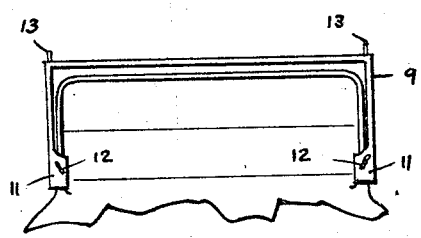
Fig. 4 is a front elevation of a wind shield, showing a bow or frame secured thereto for supporting one end of a bed.

The forward end of the bed is supported by a yoke or frame in the form of an inverted U, indicated at 9, Fig. 4. The lower extremities of this frame 9 are provided with channel members 11 adapted to partially surround the wind shield frame 2 near the body and be engaged therewith as by wing nuts 12.

The upper corners of the frame 9 are provided with studs 13 which serve the same purpose as the studs 8.

Figure 2:
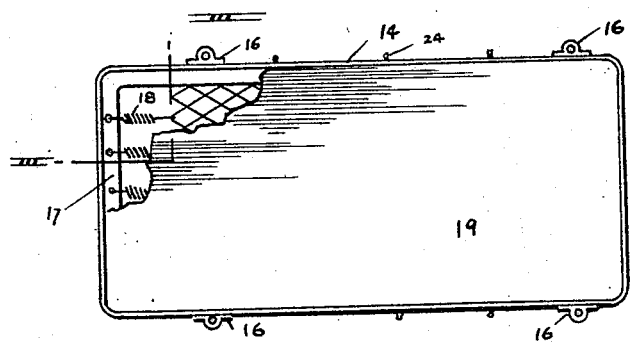
Fig. 2 is a top plan view of the bed frame.
Figure 5:
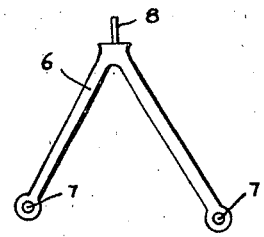
Fig. 5 is an elevation of a brace support.

At 14, Fig. 2, we show a bed frame, preferably formed of T iron and provided at suitable intervals with bearings 16 to engage the studs 8 and 13.

Figure 3:
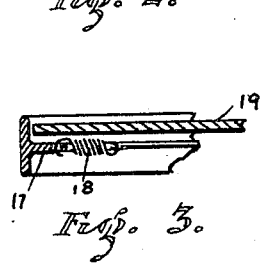
Fig. 3 is a section of Fig. 2 on the line III—III.

In Fig. 3 we show the frame 14 in cross section. The central flange 17 of the T iron is used to engage springs 18 which carry the usual woven wire fabric of a bed spring. The flange 17 also serves to support a panel 19 of wall board or any suitable material which will serve as a shade.

It is obvious that two or more frames 14 may be carried as described, also that a false top as indicated in dotted lines at 21 in Fig. 1 might be hinged at one end of the frame 14 to enhance the appearance, and to enclose bedding, if desired.

Figure 6:
Fig. 6 is an elevation of a leg support for a bed.

In Fig. 6 at 22, we show a leg member adapted to support the bed frame when removed from the top. The leg 22 is provided with a reduced stud member 23 adapted to enter the bearings 16.

The operation of our invention is as follows: When a camping trip is contemplated, the top is removed from the body 1 and the brace supports are secured to stud bolts 3 and 4. The frame 9 is attached to the wind shield frame. The bed frame is lifted and deposited on the studs 8 and 13, and the cover 19 laid in the frame.

We find in practice that this structure is a great convenience in transportation, and that a saving in time is effected in setting up the bed, and that a better bed may be used in camping than can be obtained by the use of collapsible or rolled devices.

It is a distinct advantage to be able to carry the bed overhead, as this gives full use of the body of the car and affords a sun shade as well.

At 24, we show the usual studs for engaging curtain fasteners to complete the enclosed top, if desired.

It is obvious that the bed may be carried above the top if desired, or above the folded top without detaching, and that our device could easily be applied to closed cars.

We claim:

In combination with an automobile body having a windshield, a frame adapted to engage said wind shield and provided with upstanding studs, brace supports in form of an inverted Y, the legs of the Y adapted to engage stud bolts on said body, the stem of said Y provided with an upstanding stud; and a bed frame provided with bearings adapted to engage all of said upstanding studs, and be supported in the normal position of the vehicle top, whereby said bed frame may serve as the vehicle top during transport and be removed to serve as a bed.

In testimony whereof we affix our signatures.

JOHN F. BLASAUF.
LAURENCE V. HOSE.